(12) United States Patent
Rivalto

(10) Patent No.: US 6,690,997 B2
(45) Date of Patent: Feb. 10, 2004

(54) SYSTEM FOR AUTOMATED PACKAGE-PICK UP AND DELIVERY

(75) Inventor: Michael A. Rivalto, Memphis, TN (US)

(73) Assignee: M.A. Rivalto, Inc., Memphis, TN (US)

(*) Notice: Subject to any disclaimer, the term of this patent is extended or adjusted under 35 U.S.C. 154(b) by 35 days.

(21) Appl. No.: 09/952,408

(22) Filed: Sep. 13, 2001

(65) Prior Publication Data

US 2003/0050732 A1 Mar. 13, 2003

(51) Int. Cl.⁷ .............................................. G06F 17/00
(52) U.S. Cl. ...................................... 700/237; 700/242
(58) Field of Search .............................. 700/231, 232, 700/241, 237, 242, 214; 414/270

(56) References Cited

U.S. PATENT DOCUMENTS

| | | | |
|---|---|---|---|
| 3,647,026 A | | 3/1972 | Alexander et al. |
| 4,073,368 A | | 2/1978 | Mustapick |
| 4,111,282 A | | 9/1978 | Vayda, Jr. |
| 4,169,521 A | | 10/1979 | Vayda, Jr. |
| 4,204,635 A | * | 5/1980 | Hofmann et al. ............ 235/382 |
| 4,311,211 A | | 1/1982 | Benjamin et al. |
| 4,636,634 A | * | 1/1987 | Harper et al. ............ 250/223 R |
| 4,638,312 A | | 1/1987 | Quinn et al. |
| 4,643,495 A | * | 2/1987 | Pepping et al. ............. 312/268 |
| 4,675,515 A | | 6/1987 | Lucero |
| 4,792,270 A | * | 12/1988 | Yoshida ...................... 414/273 |
| 4,803,348 A | | 2/1989 | Lohrey et al. |
| 4,805,738 A | | 2/1989 | Vayda |
| 4,813,752 A | * | 3/1989 | Schindler ..................... 312/268 |
| 4,877,121 A | * | 10/1989 | Yamashita et al. ........ 198/475.1 |
| 4,894,717 A | * | 1/1990 | Komei ......................... 348/150 |
| 4,975,012 A | * | 12/1990 | Motoda ....................... 414/279 |
| 4,997,076 A | * | 3/1991 | Hirschfeld et al. .......... 194/212 |
| 5,003,505 A | | 3/1991 | McClelland |
| 5,016,736 A | | 5/1991 | Vayda |
| 5,052,519 A | | 10/1991 | Woodham |
| 5,108,163 A | * | 4/1992 | Nakatsu ....................... 312/268 |
| 5,113,974 A | | 5/1992 | Vayda |
| 5,128,862 A | | 7/1992 | Mueller |

(List continued on next page.)

FOREIGN PATENT DOCUMENTS

| | | |
|---|---|---|
| DE | 4134972 A1 | 4/1993 |
| JP | 4199498 | 7/1992 |

OTHER PUBLICATIONS

"Etrue Solutions", Biometrics measure biological characteristics or behaviors of people to identify who they are, eTrue, Inc., Southboro, MA 01772 (http://www.miros.com/solutions/biometrics.htm, Sep. 5, 2001). 1 pg.

"About eTrue", eTrue, Inc., Southbor, MA 01772 (http://www.miros.com/about/index.htm Sep. 5, 2001,. 1 pg.

"eTrue Authentication Service", eTrue's Biometric Trusted Service (http://www.miros.com/solutions/authentication.htm Sep. 5, 2001). 2 pgs.

"eTrue—First in Biometric Trusted Services", eTrue Overview (eTrue, Inc., Southboro, MA 01772). 2 pgs.

*Primary Examiner*—Khoi H. Tran
(74) *Attorney, Agent, or Firm*—Brooks Kushman P.C.

(57) ABSTRACT

A system and method for automated package delivery and pick-up include at least one package portal located in a delivery and pick-up station to receive and dispense packages from the station. A station controller is coupled to an information input system and the package receiving and dispensing portal mechanism, and is arranged to associate package and intended recipient identification information with a received package. The controller is also arranged to process identification information, which may include biometric information, to authenticate the identity of an intended recipient, and to permit dispensing of the package from the at least one portal in response thereto. The station supports unattended delivery and pick-up of packages to improve overall efficiency of a package delivery system as well as user convenience and safety.

23 Claims, 2 Drawing Sheets

U.S. PATENT DOCUMENTS

| | | | |
|---|---|---|---|
| 5,158,155 A | | 10/1992 | Domain et al. |
| 5,223,829 A | * | 6/1993 | Watabe ............... 340/5.73 |
| 5,235,509 A | | 8/1993 | Mueller et al. |
| 5,271,703 A | | 12/1993 | Lindqvist et al. |
| 5,385,265 A | * | 1/1995 | Schlamp ............... 221/7 |
| 5,401,946 A | | 3/1995 | Weinblatt |
| 5,482,139 A | | 1/1996 | Rivalto |
| 5,509,572 A | | 4/1996 | Curtis |
| 5,774,053 A | * | 6/1998 | Porter ............... 340/568.1 |
| 5,912,818 A | * | 6/1999 | McGrady et al. ...... 700/232 |
| 6,010,064 A | * | 1/2000 | Umeda et al. ......... 235/375 |
| 6,010,239 A | | 1/2000 | Hardgrave et al. |
| 6,142,876 A | | 11/2000 | Cumbers |
| 6,234,900 B1 | | 5/2001 | Cumbers |
| 6,246,925 B1 | * | 6/2001 | Robinson et al. ...... 700/223 |
| 6,259,352 B1 | * | 7/2001 | Yulkowski et al. ...... 340/5.7 |
| 6,300,873 B1 | * | 10/2001 | Kucharczyk et al. .... 340/568.1 |
| 6,323,782 B1 | * | 11/2001 | Stephens et al. ....... 340/10.31 |
| 6,344,796 B1 | * | 2/2002 | Ogilvie et al. ......... 340/568.1 |
| 6,416,270 B1 | * | 7/2002 | Steury et al. ........... 414/282 |
| 6,421,580 B1 | * | 7/2002 | Robrechts ............. 700/214 |
| 6,456,900 B1 | * | 9/2002 | Kakuta ................. 700/233 |

* cited by examiner

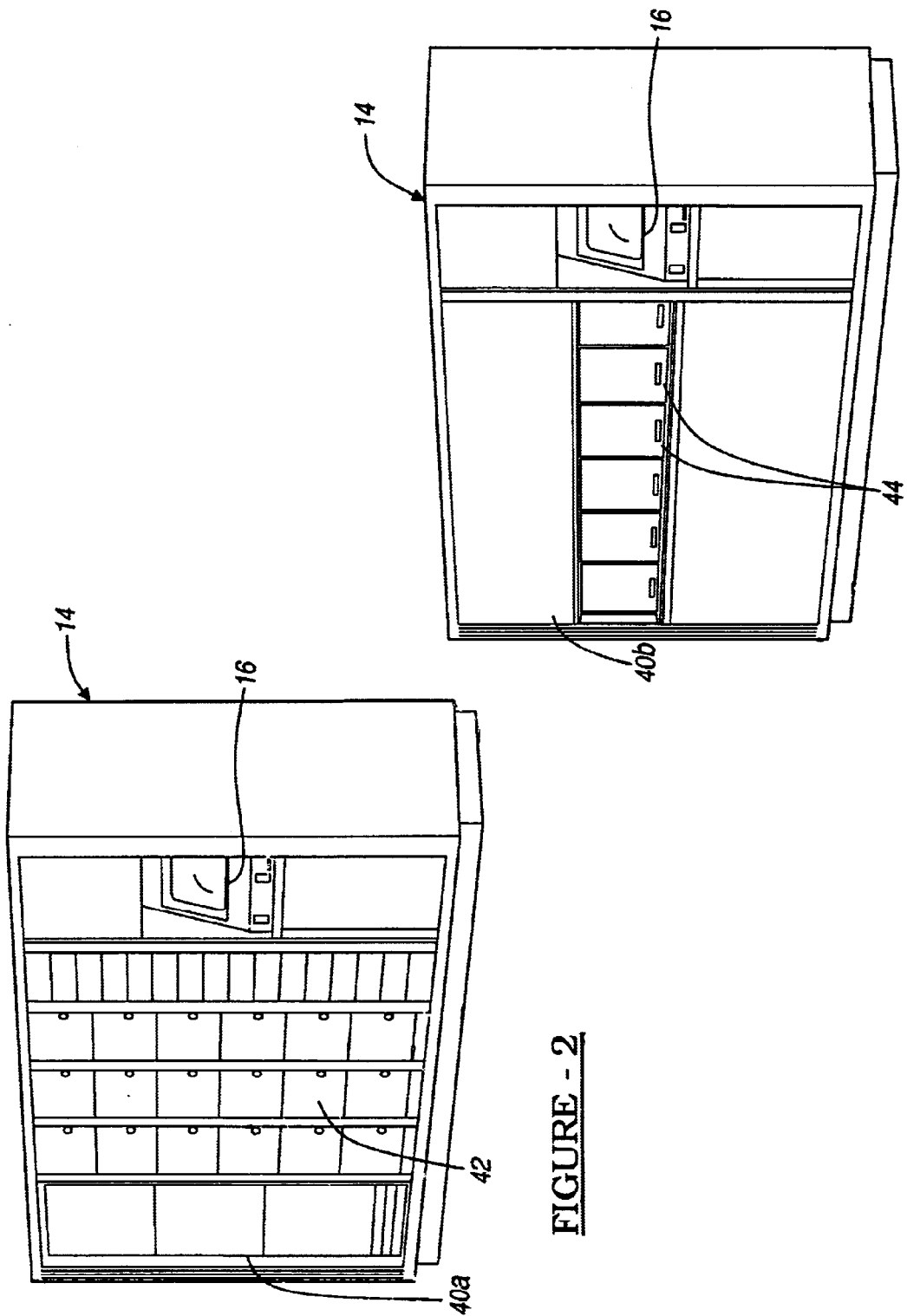

SYSTEM FOR AUTOMATED PACKAGE-PICK UP AND DELIVERY

BACKGROUND OF THE INVENTION

1. Field of the Invention

The present invention relates to package or parcel delivery arrangements suitable for receiving and delivering shipped packages.

2. Background Art

Generally, known package pick-up and delivery arrangements used to distribute goods or packages fundamentally operate on human interaction. For example, goods are typically collected by a courier at a drop box or scheduled on-site pick-up. Information identifying the packages and their destination is typically entered into a centralized tracking database by the courier or other personnel. The packages are then transported to a distribution node for sorting, routing, and hand delivery to the intended destination. Delivery of the packages again requires a courier to physically carry the package to the intended destination. If a package can not be delivered to the destination, for example a home residence where none of the occupants are home at the time of delivery, the package must be couriered to a retention facility for later pick-up by the intended party or another delivery attempt must be scheduled.

Because of the need for couriers to physically travel to the point of pick-up and delivery, such arrangements are inherently inefficient in management of time and resources. This is particularly true because of the high rate of missed deliveries where the intended recipient was not present at the destination. For residential delivery, missed deliveries have become particularly problematic due to the ever increasing amount of shipping resulting from increased on-line purchasing of goods. In addition, hand delivery of packages can pose significant risks to the safety of couriers who must sometimes travel to high crime areas in order to pick-up or deliver packages.

Because of the high level of inefficiency, inconvenience, and potential danger to couriers in traditional package delivery systems, shipping companies have made some attempts to provide consolidated drop-off services that allow shipped packages to be sent to a neutral drop-off site for subsequent pick-up by the intended party. As a consequence, such arrangements eliminate the need for a courier to travel to the intended destination. However, known arrangements require recipients to be pre-registered and to specifically designate such delivery as part of the shipping instructions. In addition, unique PIN-type authentication arrangements are typically employed in order to authenticate the intended party at the time of package pick-up. Such PIN-type arrangements tend to be inconvenient, as well as add to the overall complexity of maintaining the system as a result of the need to assign and manage the unique PIN numbers. Still further, such arrangements may present certain risks and additional costs relating to liability for the shipped packages while being held for pick-up.

Thus, a need exists for a practical way of delivering packages or parcels that satisfactorily addresses these issues.

SUMMARY OF THE INVENTION

In accordance with one aspect of the present invention, an automated package delivery and pick-up arrangement is provided that allows unattended delivery and pick-up of packages in a user-friendly manner.

In accordance with this and other aspects, the present invention provides an automated package delivery and pick-up station having a housing, at least one information input system coupled to the housing to receive shipping and identification information, and at least one package portal located in the housing and arranged to receive and dispense packages, the portal including an access control arrangement to secure a received package within the housing. A controller is coupled to the at least one information input system and the access control arrangement of the at least one package receiving and dispensing portal, and is arranged to associate package and intended recipient identification information with a received package, and control operation of the access control arrangement to permit depositing of the package into the at least one package portal. The controller is also arranged to process identification information to authenticate the presence of an intended recipient, and to control operation of the access control arrangement to permit dispensing of the package from the at least one portal.

In accordance with one embodiment of the present invention, the at least one package portal can comprise a plurality of locker compartments. In accordance with another embodiment, the at least one package portal comprises a plurality of package receiving and dispensing bays. In addition, an automated package transport mechanism can be provided and operated by the controller to automatically transport a package deposited in the portal to a designated bin holder located within the housing and back again for subsequent dispensing of the package. The access control arrangement can include a door and an electronically controllable latch mechanism connected to each locker compartment or receiving and dispensing bay. The at least one package portal can include a plurality of portals having different size dimensions, and the at least one information input system can include a data reader device arranged to read information from a credit/debit card, a touch screen display device, a portable wireless data transmitter, and/or biometric data acquisition device. Biometric information may be used to uniquely identify the recipient and may include scanners, cameras, microphones, or other input devices to acquire a finger print, signature, voice pattern, iris pattern or face pattern, for example.

The present invention will be more fully understood upon reading the following detailed description of the preferred embodiment in conjunction with the accompanying drawings.

BRIEF DESCRIPTION OF THE DRAWINGS

FIG. 2 is a perspective view of an automated package delivery and pick-up station in accordance with a first exemplary embodiment; and FIG. 3 is a perspective view of an automated package delivery and pick-up station in accordance with a second exemplary embodiment.

DETAILED DESCRIPTION OF THE PREFERRED EMBODIMENT(S)

Figure 1:
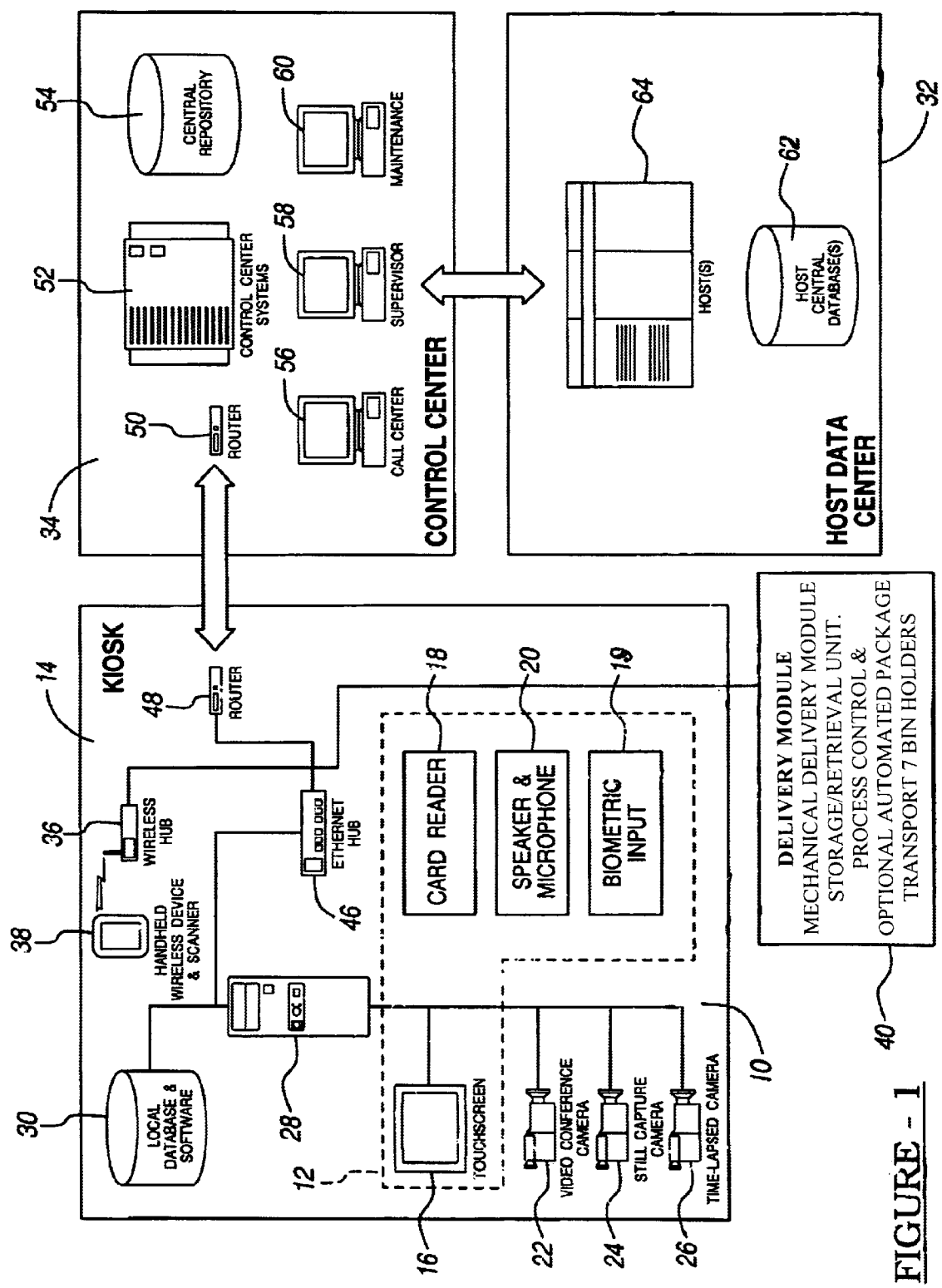
FIG. 1 is a block diagram of a package delivery system including an automated package delivery and pick-up station in accordance with the present invention.

As shown in FIG. 1, an automated package pick-up and delivery station or kiosk 10 is provided having at least one interface unit 12 located on the exterior of a storage housing 14. The interface unit 12 includes a customer input and display arrangement, such as a touch screen 16, a card reader 18 for reading information from a credit/debit or other type of identification card, a biometric input device or devices 19, and a speaker and microphone 20. Biometric input device 19 may include a finger print or iris scanner, input pad for signature verification, camera for face recognition, and/or microphone for voice recognition. The interface unit could also include a cash receiving system (not shown) for allowing station 10 to conduct cash-type transactions.

Station 10 can also include various cameras located thereon to improve customer service or station security. For example, a video conferencing camera 22 can be provided to allow for interactive conferencing with an off-site attendant. A still capture camera 24 and/or time-lapsed camera 26 can be included to provide suitable security surveillance for the station. Operation of the camera(s) can be event or transaction triggered.

Each component or subsystem is connected to a station controller 28, such as a suitably equipped computer system, having a local database and programming arrangement 30 for controlling overall operation of the station. Controller 28 also provides a control and data interface for one or more off-site host package delivery data centers 32 as well as a centralized station control and monitoring center 34. Station 10 also includes a wireless receiver and hub 36 arranged to communicate with a portable wireless input device and scanner 38 typically used by delivery couriers.

In accordance with the present invention, receipt and delivery of packages does not require the presence of delivery company personnel. The unattended package receipt and delivery capability of station 10 is provided by arranging controller 28 to control and manage operation of a mechanical delivery module 40 housed within housing 14. Delivery module 40 can be any suitable automated package handling system having at least one portal arranged to receive, store, and dispense packages of various sizes within the station, and will generally include an access control arrangement, such as a door and electronic latch mechanism, that operates to secure the package portal(s) and storage area.

In one exemplary embodiment shown in FIG. 2, a delivery module 40a includes a plurality of various size portals in the form of locker compartments 42 arranged to be electronically unlatched and associated with one or more packages deposited therein. The packages can be deposited by a courier or a walk-up customer. Association of the package with a particular locker or lockers is done upon input of suitable identifying information via interface 12 or input device 38. Controller 28 provides suitable communication with a host data center 32 so that package receipt, delivery, and billing information is collected and maintained. Likewise controller 28 operates in conjunction with the host data center 32 to verify and authenticate anyone attempting to retrieve a deposited package. Upon authentication, the associated locker door is unlatched allowing retrieval of the package or packages stored therein.

In another exemplary embodiment shown in FIG. 3, a delivery module 40b includes a plurality of package receiving and dispensing bays 44 arranged to be selectively accessible by a person under control of controller 28. Inside housing 14, delivery module 40b includes a package moving mechanism coupled to each bay 44 for transporting a deposited package to and from a bay under control by controller 28. For example, the package moving mechanism can be implemented as one or more internal vertically rotating bin holders (not shown). A motorized conveyor (not shown) can be used to transport packages between each bay to the rotating mechanism. Controller 28 is arranged to associate a deposited package with a particular bin holder, and rotate the bin holder as needed to store, retrieve, and dispense the package from station 10. The bins are preferably of different sizes in accommodate handling of packages of various dimensions. A courier or other authorized person can select a desired bin at the time of deposit. Likewise, a customer can be prompted via interface 12 to select an appropriate bin or bin size.

Referring again to FIG. 1, an Ethernet hub 46 can be used to connect controller 28 to delivery module 40 as well as wireless hub 36. Likewise, Ethernet hub 46 can be used to couple station 10 to control center 34 via a suitable router 48. Control center 34 includes a suitable router 50 to facilitate communication with appropriate control center monitoring systems 52. Control center 34 would also include a suitable central database 54 and one or more control terminals shown as a call center 56, supervisor station 58,and maintenance terminal 60.

Host data center 32 includes a host central database 62 and various host systems 64 arranged to control overall receipt and delivery of packages throughout a designated geographic area. Host data center 32 is arranged to communicate with control center 34 or station controller 28.

In operation, when a courier is unable to effect delivery of a package to an intended destination, the courier can leave a notice at the destination advising the intended consignee that the package has been transferred to an automated pick-up station 10. The courier can wait until the end of the route to take all undelivered packages at one time to a designated station 10 and deposit the packages therein for later retrieval by the intended consignees. To pick-up a deposited package, a consignee authenticates their identity via interface 12, and controller 28 controls delivery module 40 to allow the consignee to retrieve the respective package or packages.

In accordance with an exemplary embodiment, positive authentication can be provided using identifying information from the consignee or recipient. For example, a credit card, or other type of card having suitable identifying information thereon, can be used to match the identifying information with consignee information entered into the host database. Similarly, biometric information may be provided by the consignee such as a fingerprint or iris scan which is compared to previously obtained information stored in the host database. Alternatively, a third-party authentication service may be used with any of the above authentication information relayed to the third-party service for identification or verification. The third-party service may provide an accept, reject, or unable to verify signal or may provide other identifying information (such as a name and address) based on the identifying information (iris pattern, fingerprint, etc.). Authentication can be also be provided by using selected digits from an assigned package tracking number as a unique pin number. Still further, authentication can be provided by presenting a receipt, which may include a conventional, two-dimensional, three-dimensional, or holographic bar code, for example, to a reader or camera. Finally, authentication can also be provided via real-time interactive video conferencing with an off-site attendant.

As noted above, in addition to couriers, packages can be directly deposited into station 10 by a walk-up customer. Using interface 12, the customer can input information relating to destination and shipping payment, which can then be forwarded to a host 32 for processing. A courier can be notified to pick-up the deposited package, or if the intended consignee is within the coverage area of the station 10, a notice can be sent to the consignee regarding pick-up of the package. Still further, with the present invention, purchasers of a product to be shipped can avoid home delivery altogether simply by electing to have the package(s) delivered to an automated delivery and pick-up station. Upon receiving appropriate notice, the recipient can then pick-up the shipped package(s) from the automated station at their convenience.

Thus, the present invention provides an automated station and method for unattended delivery and pick-up of packages which allows both deposit and retrieval of packages by customers and couriers without the need for prior customer sign-up. As a result, overall efficiency, convenience, and safety of the package delivery is improved. The present invention can be particularly advantageous for delivery of packages to: high crime areas; apartment dwellings without doorman or concierges; businesses that want a "hold-at-location" package pick-up option; individuals that want a remote, addressable pick-up box location that can be conveniently accessed when desired to retrieve a package; and individuals who want a safe, secure, and flexible pick-up location for delivery/receipt of packages.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An automated package pick-up and delivery station comprising:
    a housing;
    at least one information input system including a biometric input device coupled to the housing to receive shipping and identification information;
    at least one package portal located in the housing and arranged to receive and dispense packages, the portal including an access control arrangement to secure a received package within the housing;
    a controller coupled to the at least one information input system and the access control arrangement of the at least one package receiving and dispensing portal, wherein the controller is arranged to associate package and intended recipient identification information with a received package, and control operation of the access control arrangement to permit depositing of the package into the at least one package portal, the controller also being arranged to process identification information to authenticate identity of an intended recipient, send and receive identification and authentication information to a remote central data collection system and to control operation of the access control arrangement to permit dispensing of the package from the at least one portal; and
    a video conferencing system connected to the controller for allowing an individual present at the housing to communicate with an off-site attendant.

2. The automated package pick-up and delivery station of claim 1 wherein the at least one package portal comprises a plurality of locker compartments.

3. The automated package pick-up and delivery station of claim 2 wherein the access control arrangement comprises a door and an electronically controllable latch mechanism connected to each locker compartment.

4. The automated package pick-up and delivery station of claim 1 wherein the at least one package portal comprises a plurality of package receiving and dispensing bays.

5. The automated package pick-up and delivery station of claim 4 wherein the access control arrangement comprises a door and an electronically controllable latch mechanism connected to each receiving and dispensing bay.

6. The automated package pick-up and delivery station of claim 4 further comprising an automated package transport mechanism operated by the controller to automatically transport a package deposited into the portal to a designated bin holder located within the housing.

7. The automated package pick-up and delivery station of claim 6 wherein the automated package transport mechanism is further arranged to be operated by the controller to transport a package from a bin holder to a designated portal for dispensing therefrom.

8. The automated package pick-up and delivery station of claim 1 wherein the at least one package portal comprises a plurality of portals having different size dimensions.

9. The automated package pick-up and delivery station of claim 1 wherein the at least one information input system comprises a data reader device arranged to read information from a credit/debit card.

10. The automated package pick-up and delivery station of claim 1 wherein the at least one information input system comprises a touch screen display device.

11. The automated package pick-up and delivery station of claim 1 wherein the at least one information input system comprises a receiver for receiving signals transmitted by a portable wireless data transmitter.

12. The automated package pick-up and delivery station of claim 1 wherein the biometric input device comprises an iris scanner.

13. The automated package pick-up and delivery station of claim 1 wherein the biometric input device comprises a fingerprint scanner.

14. The automated package pick-up and delivery station of claim 1 wherein the biometric input device comprises an input pad arranged for signature recognition.

15. The automated package pick-up and delivery station of claim 1 wherein the biometric input device comprises a camera arranged for authentication.

16. The automated package pick-up and delivery station of claim 1 wherein the at least one information input system comprises a scanner arranged to read a bar code.

17. An automated package pick-up and delivery station comprising:
    a housing;
    at least one information input system coupled to the housing to receive shipping and identification information, the input system including a touch screen display device, a data reader device arranged to read information from a credit/debit card, a scanner arranged to read a bar code and a biometric input device;
    at least one package portal located in the housing and arranged to receive and dispense packages, the portal including an access control arrangement to secure a received package within the housing;
    a controller coupled to the at least one information input system and the access control arrangement of the at least one package receiving and dispensing portal, wherein the controller is arranged to associate package and intended recipient identification information with a received package, and control operation of the access control arrangement to permit depositing of the package into the at least one package portal, the controller also being arranged to process identification information to authenticate identity of an intended recipient, send and receive identification and authentication information to a remote central data collection system and to control operation of the access control arrangement to permit dispensing of the package from the at least one portal; and a video conferencing system connected to the controller for allowing an individual present at the housing to communicate with an off-site attendant.

18. The automated package pick-up and delivery station of claim 17 wherein the biometric input device comprises a camera arranged to identify information and communicate the signature to the off-site attendant for verification.

19. The automated package pick-up and delivery station of claim 17 wherein the at least one package portal comprises a plurality of locker compartments and the access control arrangement comprising a door and an electronically controllable latch mechanism connected to each locker compartment.

20. The automated package pick-up and delivery station of claim 17 wherein the at least one package portal comprises a plurality of package receiving and dispensing bays and the access control arrangement comprises a door and an electronically controllable latch mechanism connected to each receiving and dispensing bay.

21. The automated package pick-up and delivery station of claim 20 further comprising an automated package transport mechanism operated by the controller to automatically transport a package deposited into the portal to a designated bin holder located within the housing.

22. The automated package pick-up and delivery station of claim 21 wherein the automated package transport mechanism is further arranged to be operated by the controller to transport a package from a bin holder to a designated portal for dispensing therefrom.

23. An automated package pick-up and delivery station comprising:

a housing;

at least one information input system coupled to the housing to receive shipping and identification information, the input system including a touch screen display device, a data reader device arranged to read information from a credit/debit card, a scanner arranged to read a bar code and a camera arranged to identify information and communicate the information to an off-site attendant for authentication;

a plurality of package and receiving dispensing bays located in the housing and arranged to receive and dispense packages;

an access control arrangement to secure a received package within the housing including a door and an electronically controllable latch mechanism connected to each receiving and dispensing bay;

a controller coupled to the at least one information input system and the access control arrangement of the at least one package receiving and dispensing portal, wherein the controller is arranged to associate package and intended recipient identification information with a received package, and control operation of the access control arrangement to permit depositing of the package into the at least one package portal, the controller also being arranged to process identification information to authenticate identity of an intended recipient, send and receive identification and authentication information to a remote central data collection system and to control operation of the access control arrangement to permit dispensing of the package from the at least one portal;

an automated package transport mechanism operated by the controller to automatically transport a package deposited into the portal to a designated bin holder located within the housing; and a video conferencing system connected to the controller for allowing an individual present at the housing to communicate with the off-site attendant.

* * * * *

UNITED STATES PATENT AND TRADEMARK OFFICE
CERTIFICATE OF CORRECTION

PATENT NO. : 6,690,997 B2
DATED : February 10, 2004
INVENTOR(S) : Michael A. Rivalto It is certified that error appears in the above-identified patent and that said Letters Patent is hereby corrected as shown below:

Column 7,
Line 12, delete "signature" and insert therefor -- information --.
Line 12, delete "verification" and insert therefor -- authentication --.

Signed and Sealed this

Fifteenth Day of June, 2004

JON W. DUDAS
*Acting Director of the United States Patent and Trademark Office*